United States Patent [19]

King et al.

[11] Patent Number: 5,529,112
[45] Date of Patent: Jun. 25, 1996

[54] COOLANT CONTROL METHOD AND APPARATUS FOR VEHICLE AIR CONDITIONING SYSTEM

[75] Inventors: Jeremy A. King, Kokomo, Ind.; James N. Athans, Tonawanda, N.Y.; Wayne A. Madsen, Kokomo, Ind.

[73] Assignee: Delco Electronics Corporation, Kokomo, Ind.

[21] Appl. No.: 311,629

[22] Filed: Sep. 23, 1994

[51] Int. Cl.$^6$ .............................. F25B 29/00; B60H 1/02
[52] U.S. Cl. ................... 165/2; 165/42; 165/43; 165/14; 237/12.3 A; 237/12.3 B; 318/626
[58] Field of Search ................... 165/42, 43, 2, 165/14; 237/12.3 A, 12.3 B; 318/626

[56] References Cited

U.S. PATENT DOCUMENTS

| | | | |
|---|---|---|---|
| 4,246,526 | 1/1981 | Phillips | 318/626 |
| 4,326,667 | 4/1982 | Murata et al. | 237/12.3 A |
| 4,653,689 | 3/1987 | Sakurai et al. | 165/42 |
| 4,815,658 | 3/1989 | Hidemitsu et al. | 237/12.3 B |

FOREIGN PATENT DOCUMENTS

| 1278202 | 6/1972 | United Kingdom | 165/42 |
|---|---|---|---|

*Primary Examiner*—John K. Ford
*Attorney, Agent, or Firm*—Jimmy L. Funke

[57] ABSTRACT

A coolant shutoff valve is closed when a motor-operated temperature door is moved to full cold position to prevent heating of air due to radiation, conduction, convection, or leakage around the door. The motor moves the door to hot or cold limit positions and remains in a stall condition to maintain such positions. A motor control responsive to operator selected temperature moves the door to such limit positions. A shutoff circuit associated with the motor control senses whether a hot or cold mode is selected and detects from the motor current whether the motor is stalled. When the circuit determines both a cold mode and motor stall current an actuation signal is sent to the shutoff valve.

9 Claims, 2 Drawing Sheets

COOLANT CONTROL METHOD AND APPARATUS FOR VEHICLE AIR CONDITIONING SYSTEM

FIELD OF THE INVENTION

This invention relates to air conditioning systems having heating and cooling functions and particularly to a method and apparatus for preventing heating of conditioned air during full cold conditions.

BACKGROUND OF THE INVENTION

In typical vehicle air conditioners the air passage contains a heater core supplied by engine coolant as well as an evaporator which has refrigerant supplied by an engine-driven compressor. Incoming air is cooled by the evaporator when the compressor is operating, and the air is heated if it is directed through the heater core. A temperature door controlled by an actuator is positioned in the air passage to block air flow through the heater core, or to direct all or some of the air through the heater core depending on the desired air temperature. When the temperature door is fully closed in the fullcold position, the airflow can still "scrub off" some unwanted heat from the backside of the heater core. This unwanted heat reduces the efficiency of the cooling system. Radiation and conduction from the heater core are also significant contributors to unwanted passenger compartment heating. A remedy for these heating conditions is to shut off the coolant flow to the heater core so that, once the heater core cools down, the air leakage, radiation, or conduction do not add heat to the cold air stream.

Previously such coolant valves were operated by an electrical or a vacuum switch in the control head responsive to temperature lever position and coupled by wire or vacuum line to the coolant shutoff valve, by a cable extending from the temperature lever to the valve, or by a microswitch mounted on the temperature door and coupled to the shutoff valve. Each of these special items adds complexity and cost to the vehicle, and in some cases are not practical to employ. These costs are particularly exacerbated in the case of a rear air conditioning system with its own control head in addition to a front system with its own control head, both requiring their own shutoff valves. It is desirable then to dispense with special switches, cables and the like while maintaining the coolant shutoff function.

SUMMARY OF THE INVENTION

It is therefore an object of the invention to shut off coolant to a heater core during full cold conditions without door or temperature lever controlled switches. Another object is to modify existing electronic hardware in an air conditioning system to determine when to shut off coolant to a heater core.

The invention is a modification of a well known heat, ventilation and air conditioning system for motor vehicles. In such a system hot engine coolant circulates to a heater core and a solenoid vacuum valve in the coolant system shuts off coolant flow when energized. An air conditioner evaporator and the heater core are arranged in an air passage, and a temperature door in the passage is positioned by an actuator to direct air flow through the heater core when heating is desired and to block air flow when a full cold condition is called for. The door is operated by an electric motor which is controlled by an electronic circuit responsive to a manually set temperature lever.

To control the coolant shutoff valve without a special switch to sense the door position, the electronic motor control circuit is monitored to determine that the door is closed and that the full cold condition is requested. In one embodiment an enabling circuit detects when cold mode is requested and a motor stall detection circuit monitors the motor current; upon door closing the increased current at stall triggers a valve actuation signal to stop coolant flow. As long as the full cold condition is called for, the current is applied to the motor and the valve actuation signal persists.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to a control method and apparatus effective in a cold mode to shut off coolant flow to a heater core in an air conditioning system when the temperature door is fully closed, the principle of the invention is not limited to that application. For example, it can just as easily be adapted to operate in the hot mode when the door is fully opened to provide a signal for another purpose.

Figure 1:
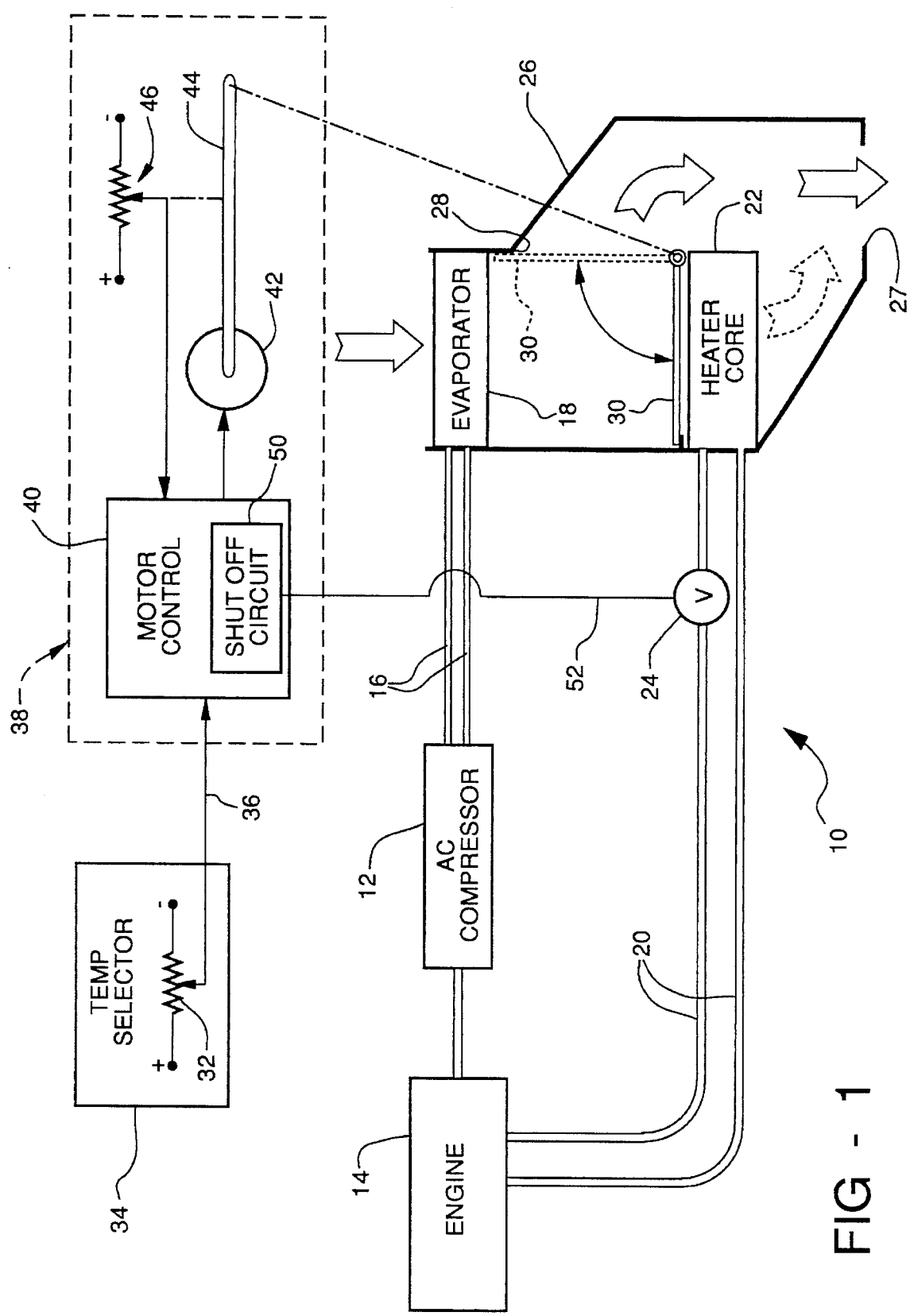
FIG. 1 is a diagram of a vehicle heating and air conditioning system including a control according to the invention.

Referring to FIG. 1, a vehicle heating and air conditioning system 10 which is conventional except for an improved coolant control comprises a compressor 12 driven by the vehicle engine 14 and coupled by lines 16 to an evaporator 18 for circulation of refrigerant to the evaporator. Lines 20 connected between the engine 14 and a heater core 22 supply hot engine coolant to the heater core. A shutoff valve 24 in one of the coolant lines 20 is electrically controlled to prevent coolant flow to the core 22. Commonly the valve is a vacuum solenoid valve which is normally open and is held closed as long as it is electrically actuated.

The evaporator 18 and the heater core 22 are both arranged in an air duct 26 such that all incoming air, represented by arrows, flows through the evaporator to be cooled, when the compressor is supplying refrigerant and then flows to a duct discharge vent 27 via the heater core 22 and/or through a bypass 28. A temperature door 30 pivots about an axis to a position blocking air flow to the heater core 22 as shown in solid lines, a position blocking the bypass 28 as shown in dashed lines, or an intermediate position permitting partial bypassing of the heater core. Even when the temperature door is blocking the heater core 22, some air leakage through the heater can occur. Convection currents reaching the rear side of the heater core are also possible, adding unwanted heating to the air stream.

The position of the temperature door is determined by a potentiometer 32 coupled to a manually positioned temperature lever in a control head 34 labelled as a Temperature Selector. The potentiometer voltage on line 36 is supplied to a door actuator 38 including a motor control 40, a motor 42 having its output shaft 44 coupled to the door 30, and a feedback potentiometer 46 which is positioned by the motor shaft and supplies a feedback voltage to the motor control 40. The motor thus actuates to door 30 for movement between its extreme positions, and the feedback potentiometer 46 produces a voltage representing door position. The motor control circuit 40 establishes a relationship between the temperature selector potentiometer 32 and the feedback potentiometer 46 and acts as a servo control so that for any given position of the potentiometer 32 the motor 42 drives the feedback potentiometer and thus the door 30 to a corresponding position.

The motor control 40 contains a shutoff circuit 50 which senses from electronic signals within the motor control when the door 30 is in full cold position, blocking flow through the heater core 22, and produces a valve energizing signal on line 52 extending to the coolant shutoff valve 24. The shutoff circuit depends on the ability to sense when a cold mode has been selected and when the motor attains a stall condition. The stall condition occurs when the motor drives the door to either of its extreme conditions. Accordingly the valve 24 is actuated when the door reaches the full cold position. As long as the temperature selector 32 continues to call for full cold condition, the motor 42 will be continuously energized in the stall condition to hold the door 30 closed and the shutoff circuit will similarly be continuously energized to hold the valve 24 closed. It should be noted that by sensing a hot mode and motor stall current, a signal indicating the full hot condition could be produced instead and used for some other purpose.

Figure 2:
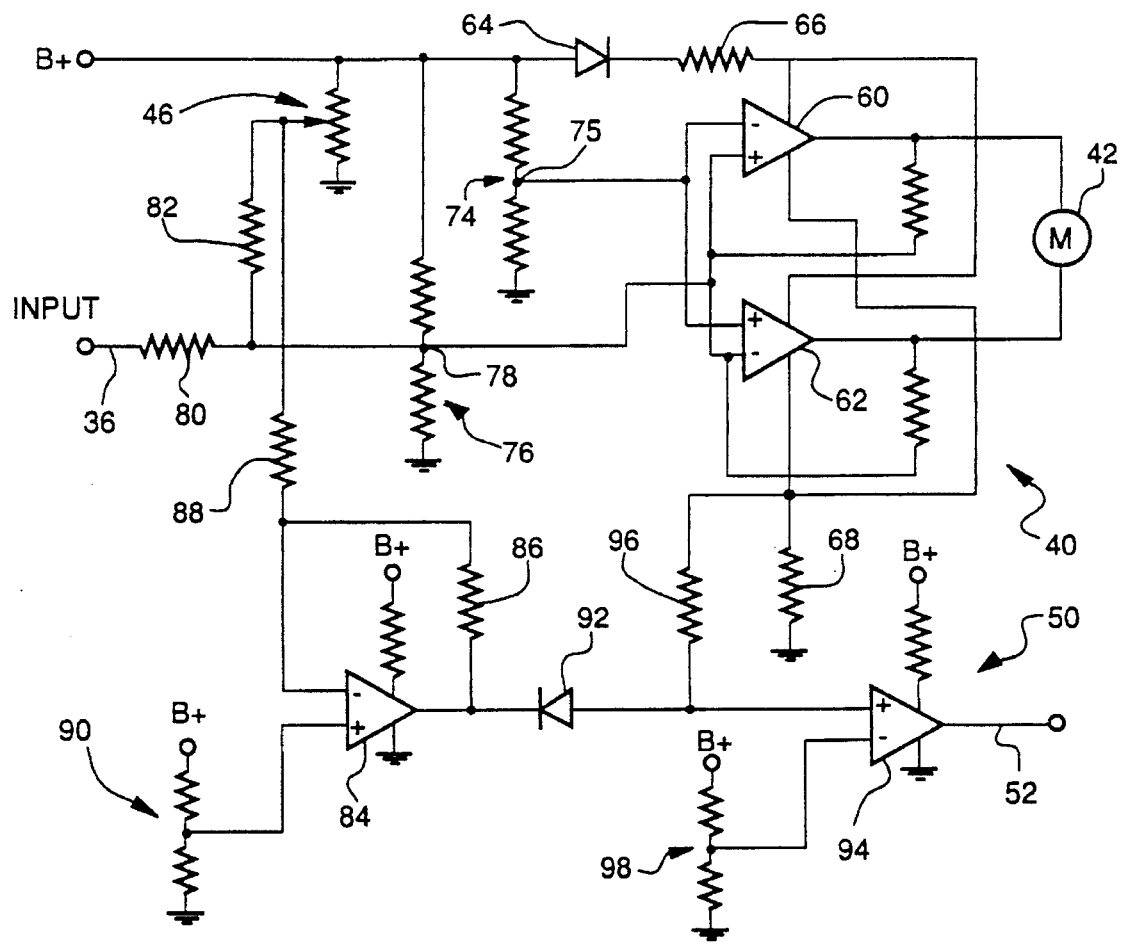
FIG. 2 is a circuit diagram of the control of FIG. 1 according to one embodiment of the invention.

The motor control 40 and shutoff circuitry 50 is shown in FIG. 2. A first comparator 60 and a second comparator 62 each have power supplied from battery B+ via a diode 64 and a voltage dropping resistor 66, and are connected to ground through another dropping resistor 68. The comparator outputs are coupled to respective motor 42 terminals. A feedback resistor 70 is connected from the output of comparator 60 to its positive input, and a feedback resistor 72 is connected from the output of comparator 62 to its negative input to provide hysteresis. A first voltage divider 74 having equal value resistors is connected at its midpoint node 75 to the negative input of the comparator 60 and to the positive input of the comparator 62. A second voltage divider 76, also comprising equal resistors has its midpoint node 78 connected to the positive input of the comparator 60 and to the negative input of the comparator 62. The temperature input signal on line 36 is connected through a resistor 80 to the node 78 and the feedback voltage from the potentiometer 46 is also connected to that node through resistor 82.

In operation, when the nodes 75 and 78 are both at one-half of B+, as established by the two voltage dividers, the comparator inputs will be balanced and both comparators will be off. This balance occurs only when the temperature selector potentiometer 32 and the feedback potentiometer 46 are in a relationship which also provides the same voltage as node 75. The movement of the temperature selector from such a balanced state will cause unbalance of both comparators 60 and 62 to produce outputs effecting energization of the motor 42 to drive the feedback potentiometer 46 in a direction to restore balance. For one sense of unbalance, the comparator 60 will produce a high output and the comparator 62 will produce a low output so that current will flow from B+via resistor 66, comparator 60, motor 42, comparator 62 and resistor 68 to ground, causing motor rotation in one direction. For the opposite sense of unbalance, the comparator outputs will have the opposite polarities to drive the motor in the other direction. The circuit is biased so that when the door reaches either extreme to stall the motor, the comparator inputs are not balanced and the motor current continues.

The shutoff circuit 50, which is readily packaged as a part of the motor control but does not affect the motor control function, comprises a two stage logic circuit. One stage detects operation in the cold mode and enables the second stage only when the cold mode is indicated. The second stage, when enabled, senses motor stall by monitoring the motor current, and produces the coolant valve 24 actuation output on line 52.

The first stage includes a comparator 84 having a feedback resistor 86 from its output to its negative input, and the feedback signal from the potentiometer 46 is coupled through a resistor 88 to the negative input. A voltage divider 90 between B+ and ground has its node connected to the positive input of the comparator 84. The divider 90 is adjusted to produce a node voltage which is equivalent to the feedback voltage produced at or near a full cold door position. In the configuration shown in the drawing, a high feedback voltage corresponds to high temperature and low voltage corresponds to cold. For high temperatures settings of potentiometer 46 the comparator 84 output will be low, and the output will become high when the feedback voltage falls to the divider 90 voltage. A diode 92, poled to conduct when the comparator 84 output is low, couples the first stage the second stage.

The second stage for detecting motor stall comprises a comparator 94 having its positive input connected to the diode 92 and to the high side of the voltage dropping resistor 68 via a resistor 96. A voltage divider 98 has its node connected to the negative input of comparator 94. The node voltage is selected to be above the resistor 68 voltage produced during ordinary running of the motor but just below the voltage produced upon motor stall. The comparator 94 output is connected to line 52 and is the valve actuation signal.

In operation of the shutoff circuit, if the feedback voltage from potentiometer 46 is high, indicating a high temperature condition, comparator 84 output is low, disabling the second stage by applying a low voltage to positive input of the comparator 94. When in a low temperature mode and the comparator 84 is turned on, the high output voltage is blocked from the second stage by the diode 92: then the second stage is enabled. When the door 30 reaches the full cold position causing the motor to stall, the increased motor current caused by stalling raises the voltage across the dropping resistor 68 to a value sufficient to turn on the comparator 94 to issue the valve actuation signal. Thus the shutoff circuit employs simple AND logic: if the cold mode operation is detected and motor stalling is detected, shutoff valve actuation is commanded.

Figure 3:
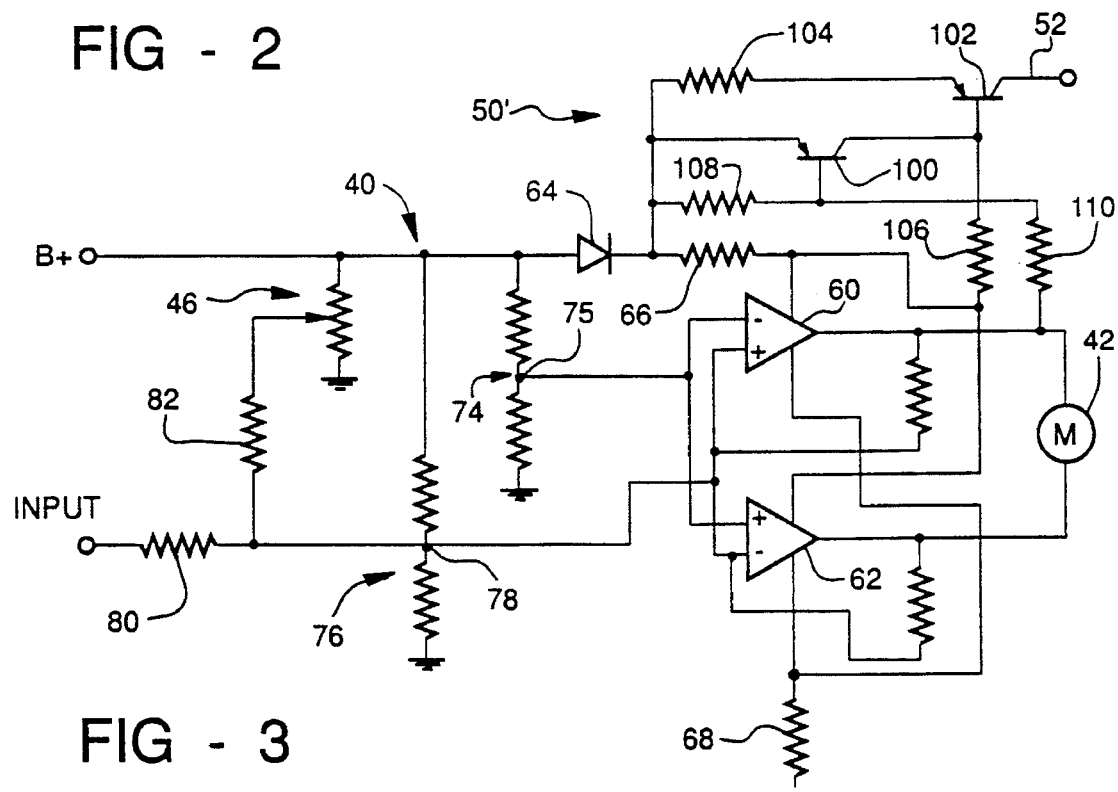
FIG. 3 is a circuit diagram of the control of FIG. 1 according to another embodiment of the invention.

An alternative embodiment is shown in FIG. 3. The motor control circuit 40 is the same as that in the FIG. 2 embodiment. The shutoff circuit 50' includes a first transistor 100 for sensing cold mode operation and a second transistor 102 for sensing motor stall current. The emitter of transistor 102 is connected through a current limiting resistor 104 to the junction of the diode 64 and the resistor 66, and the collector of transistor 100 is connected to the same point. The base of transistor 102 and the collector of transistor 100 are connected through a resistor 106 to the other side of the resistor 66. The base of transistor 100 is connected through biasing resistors 108 and 110 to the output of the comparator 60 and to the junction of the diode 64 and the resistor 66. The collector of transistor 102 is the circuit output and is connected to line 52 leading to the valve 24.

In operation, the circuit is configured so that when the motor control is in the hot mode, the comparator 60 has a low output which causes the transistor 100 to conduct, limiting the voltage across the base-emitter of transistor 102 to a value insufficient for conduction of transistor 102, thereby affording a disabling function. Enabling of transistor 102 occurs when the motor control is in the cold mode and the comparator 60 has a high output which biases the transistor 100 off. The circuit resistor values are selected so that during ordinary motor operation the voltage across the dropping resistor 66 is insufficient to bias the transistor to conduction; however the larger voltage which occurs upon motor stalling does cause conduction of transistor 102 to produce an output signal on line 52 for actuating the shutoff valve 24. The current limiting resistor 104 assures that the current will remain small enough for extended operation without damage to circuit elements. The logic of this version of the shutoff circuit is the same as that of the FIG. 2 circuit.

It will thus be seen that simple and inexpensive additions to the motor control provide a coolant shutoff valve signal which obviates the need for a door position detecting microswitch and attendant wiring, or other known expedients such as mechanical cables or a temperature selector switch to effect coolant valve actuation.

We claim:

1. In an air conditioning system for a motor vehicle having a heater core for heating air and an evaporator for cooling air, means for effecting coolant flow in the heater core, a door for controlling air flow through the heater core, and a door actuator coupled to the door, wherein the door actuator includes an electric motor for opening and closing the door and motor control circuitry, a control for minimizing heat flow comprising:

means for detecting a full cold condition including a circuit in the door actuator for producing a control signal when the door is closed, the circuit in the door actuator including means coupled to the motor control circuitry effective when a cold condition is requested and sensitive to motor current for detecting when the motor is stalled; and means responsive to the control signal for stopping coolant flow in the heater core, whereby heat input to the air is prevented when the door is closed.

2. The invention as defined in claim 1 wherein the means for stopping coolant flow comprises a shutoff valve in the means for effecting coolant flow.

3. The invention as defined in claim 1 wherein:

the circuit in the door actuator includes an enabling circuit coupled to the motor control circuitry and energized when a cold condition is requested, and a stall detecting circuit enabled by the enabling circuit and sensitive to motor current for detecting when the motor is stalled.

4. The invention as defined in claim 3 wherein the motor control circuitry develops a voltage which is dependent on the requested condition and wherein the enabling circuit includes:

means for comparing the voltage to a threshold value to detect when a cold condition is requested; and means for biasing the stall detecting circuit to an off state when a cold condition is not detected.

5. The invention as defined in claim 3 wherein the motor control circuitry has drive means for supplying motor current in one direction during a hot mode and in another direction during a cold mode, and wherein the enabling circuit includes:

a transistor coupled to the drive means and biased to conduct during a specified mode and coupled to enable the stall detecting circuit during a cold mode.

6. The invention as defined in claim 3 wherein:

the motor control circuitry has a motor current path including a voltage dropping resistor for developing a voltage dependent on motor current and having a high voltage when the motor is stalled; and the stall detecting circuit includes means for comparing the voltage across the voltage dropping resistor to a threshold value to sense the high voltage characteristic of a stall condition.

7. The invention as defined in claim 3 wherein:

the motor control circuitry has a motor current path including a voltage dropping resistor for developing a voltage dependent on motor current and having a high voltage when the motor is stalled; and the stall detecting circuit includes a transistor coupled across the voltage dropping resistor and biased to conduct when the high voltage characteristic of a stall condition occurs across the voltage dropping resistor.

8. In an air conditioning system for a motor vehicle having a heater core for heating air and an evaporator for cooling air, means for effecting coolant flow in the heater core, a door for controlling air flow through the heater core, the door being subject to air leakage when closed, and a door actuator coupled to the door and having an actuator control an electric motor for opening and closing the door, a method of minimizing heat flow when the door is closed comprising the steps of:

detecting when the actuator control is operating in a cold mode;

monitoring electric motor current supplied by the actuator control;

detecting when motor current is stall current, which indicates that the door is closed; and stopping coolant flow in the heater core upon detecting stall current when the actuator control is detected to be operating in the cold mode.

9. The invention as defined in claim 8 wherein the actuator control includes a motor position feedback, and the step of detecting when the actuator control is operating in a cold mode includes monitoring motor position.

* * * * *